Sept. 10, 1940.   J. E. TRAINER ET AL   2,214,002
WELDED ARTICLE AND METHOD OF MAKING SAME
Filed March 15, 1938   2 Sheets-Sheet 1

INVENTOR.
James E. Trainer
James C. Hodge
BY
ATTORNEY.

Patented Sept. 10, 1940

2,214,002

UNITED STATES PATENT OFFICE 2,214,002

WELDED ARTICLE AND METHOD OF MAKING SAME

James E. Trainer, Fairlawn, and James C. Hodge, Akron, Ohio, assignors to The Babcock & Wilcox Company, Newark, N. J., a corporation of New Jersey Application March 15, 1938, Serial No. 195,976

6 Claims. (Cl. 219—10)

This invention is a welded metal article and the method of making it.

High temperatures and pressures at present used in processing oils and other chemicals confront the manufacturers of pressure vessels with problems of stress and corrosion which, from the economic standpoint, are best solved by multi-metallic plates comprised of a relatively cheap and thick metal base capable of withstanding the pressure and veneered on the processing side with a corrosion resistant layer of a metal alloy adapted to withstand the service to which it is to be subjected.

Plate of the above character has, for some time, been used in the fabrication of pressure and other structures; and such plate as is common to present practice includes that wherein the alloy cladding or veneering sheet is bonded to the base metal plate by rolling and forging at welding temperatures; this type of plate has the advantage that flow of heat or thermal drainage out of the lining is radial at all locations where an adequate bond is secured but, unfortunately, with this method of forming the multi-metal plate the bond is non-uniform in character so far as integrity and heat transfer enter the picture, with the result that there is a blistering of the veneering sheet and eventually cracking which destroys the value of the corrosion resistant liner.

Another type of multi-metallic plate of which there has been some use is that wherein the cladding sheet is united to the base metal plate by spot or row welds at frequent and contiguous points, so frequently arranged as to attempt to carry away sufficient heat to prevent separation. However, plate of this character suffers the disadvantage that with spaced spots or rows experience has demonstrated that there is practically no heat drainage from the liner to the base metal except at the spots of attachment, and hence between spots of attachment the heat flow is laterally or non-radial of the liner in a cylindrical vessel, for instance, and thus a difference in temperature results in a shearing of the spot attachments, and also in a bulging of the cladding or alloy liner such as to cause flexure around each spot of attachment as the temperature changes, and thus there is developed at each such spot of attachment a weakness which is akin to that in a metal sheet which is bent many times; therefore, due to the constant flexing at these spot weld locations where flexibility abruptly changes to rigidity the shearing and bending effects ultimately result in cracks which destroy the value of the cladding as a liner.

The present invention has as a feature a type of veneered plate which, when incorporated in pressure vessels, presents the advantage of having; firstly, adequate radial drainage of heat; and, secondly, a resistance weld bonding substantially co-extensive with the superimposed areas of the base metal plate and the veneering sheet without contamination of the veneering by any constituents of the base metal plate. By this construction, there is presented a plate structure in which there is eliminated stresses heretofore referred to in reference to that type of plate welded only at such frequent and contiguous spots as provided simply for heat drainage and thus the idea of contiguity of the prior structure is replaced with continuity, and also there is secured by this new invention all of the advantages of the continuity of that type of pressure forge welded plate without the disadvantages of the non-uniform bond, and at the same time there is preserved to the alloy veneering all of the original characteristics of the veneering metal.

Particularly, the invention contemplates in a veneered type of plate of the character hereinafter described the inter-position of a barrier preventing migration of constituents of the base metal into the alloy plate during resistance welding.

Also, a feature is the veneering of a base metal sheet with another metal sheet by a method of stitch welding in which a carbon barrier sheet intermediate the two has the function not only of acting as a carbon barrier but of providing a bonding sheet which may present a lowered resistance to bonding with the base metal plate and the alloy veneering as compared with that resistance to bonding which may exist between certain alloys and the base metal if attempts are made to directly unite the same.

The manner of welding herein used is fully disclosed in the co-pending joint application of George D. Ebbets and James E. Trainer, Serial No. 195,974, and the application of Otis Richard Carpenter, Serial No. 195,975, filed of the even date herewith.

With the above and other features in view we will now describe a practical manner in which our invention has been carried out, and in connection with which the following drawings are pertinent.

In detail—

Figure 1:
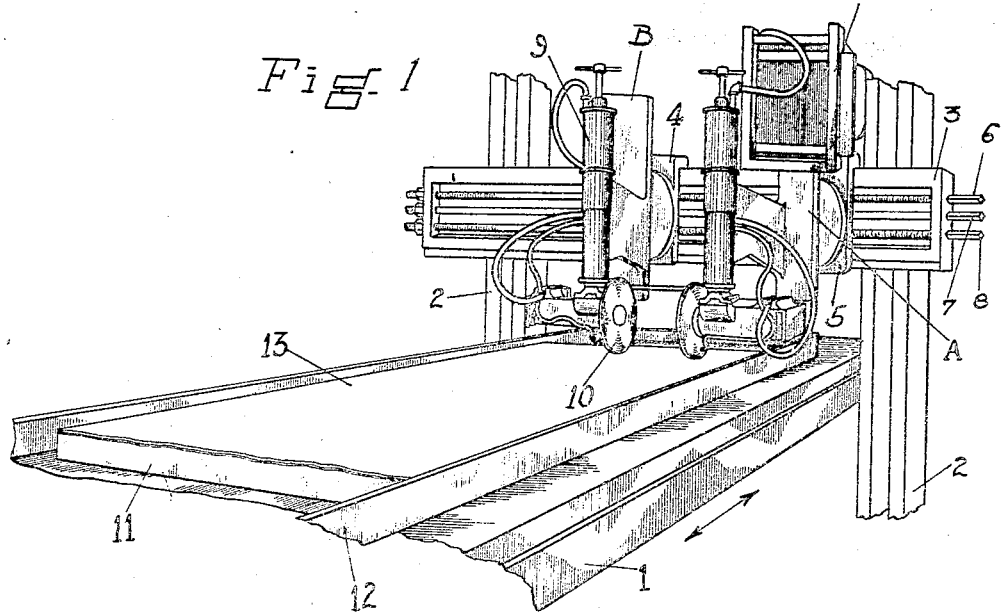
Fig. 1 is a view in perspective of a machine in which the method may be carried into practice.
Figure 2:
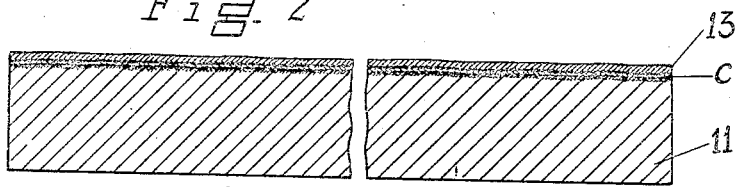
Fig. 2 is a transverse section of the completed article.

The assembly upon which the present invention has been carried into practice is a modification of a standard large size planer as illustrated in Fig. 1.

The planer bed which travels at constant speed and may be reciprocated at a uniform rate, and of which both speed and rate may be adjusted to requirements, is indicated at 1, the directions of movement being delineated by the double ended arrow. The columns 2 at each side support the vertically adjustable carriage 3 with the traversing heads 4 and 5 adjustable for distance between the heads, and adjustable for cross traverse coincidentally by the usual screw members 6, 7 and 8, all of which are common to planer construction.

However, the tool holders of the usual planer set up, and carried by the traversing heads 4 and 5 are, in the present instance, replaced by welding heads A and B, each head being of identical construction with the exception of being right and left handed and as a consequence of which only one need be here described.

Each of these welding heads A and B is of the roll seam welding type wherein a double acting infinitely adjustable stroke air cylinder 9 is supplied with air pressure on each side of its piston through air pressure reducing valves and controls, such that variations in pressure of application of a welding electrode roll 10 to the work may be secured and maintained uniform or constant as desired. The welding electrode roll 10 is of suitable copper-alloy material, and is mounted in water cooled bearings.

The work to be operated upon is a base metal plate for instance of mild steel which, in the instant illustration is of considerable thickness and is placed in a trough 12 carried by a planer bed 1, and in which it is preferably submerged in a cooling fluid such as water. The upper face of the metal base plate 11 is cleaned down to the metal by any suitable procedure to expose bare metal. It then has superimposed thereon a thin sheet C of metal which is of a character to act as a carbon migration barrier preventing contamination of the subsequently superimposed alloy veneering sheet 13 to be resistance welded thereto and to the metal base 11, all superimposed or opposed surfaces being properly cleaned for resistance welding.

Figure 5:
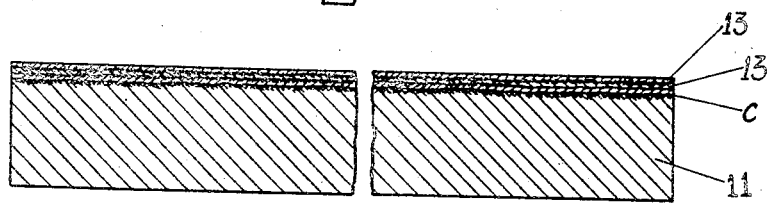
Fig. 5 is a view similar to Fig. 2 showing more than one alloy sheet welded to the base plate and with a layer adjacent the base metal plate for preventing carbon migration.

The right hand welding head in the assembly used for practicing the invention and here illustrated carries a 400 k. v. a., 440 volt welding transformer indicated at 14 in both Figs. 1 and 5. Power is obtained from a 2300 volt power supply brought into the primary of a transformer which reduces it to 440 volts A. C. single phase, one lead of which runs, as shown, directly to the 400 k. v. a. welding transformer 14, while the other lead is connected in series to an 8000 ampere power tube assembly and thence to the other side of the 400 k. v. a. welding transformer 14. The power tubes are of the well known mercury pool cathode type energized by an ignition electrode dipping into a pool of mercury and during any time interval in which the ignition electrode is passing current into the mercury pool, the power tubes are fired and will pass current into the main welding circuit. Thus to control the flow of welding current, it is only necessary to govern the periods during which the ignitor fires the mercury pool of the power tubes. Such control is effected by auxiliary grid controlled tubes which, in turn, are controlled by a synchronous motor driven inductive timer consisting of a large disc making one revolution per second and having 120 pins peripherally distributed with equal spacing. As the steel pins pass through the poles of an induction generator the current thus established energizes the grids of the control tubes which, in turn, fire the power tubes, thus the number of cycles of welding current may be varied in any combinations of 120, and therefore the welding heat, that is, the percentage of capacity used, may be controlled by a resistance in the form of a potentiometer in the control circuit adapted to cause a lagging or advancing of the grid potential of the control tubes. All of the foregoing being standard equipment on the present day market comprises a part of the present invention only in so far as it contributes to the successful carrying out of the method; to this end, it contributes the ability, in the precision type of apparatus used, to provide a continuous line of intersecting resistance welds through interruption and timing of the current in coordination with welding pressure and rate of linear movement between the work and welding head such that there is a series of current pulses that produce an alternate heating and cooling action in the weld metal, thus providing excessive heat accumulations that might build up were the current permitted to flow continuously, and thus substantially preserving the physical and metallurgical characteristics of the metal being operated upon while, at the same time, effecting an economy in current consumption over ordinary resistance spot welding at intervals.

In carrying out the present invention it is necessary to localize a sufficiently high current density at a spot, and under the location of contact of the rollers 10 which are the desired and expected spots where the welds are to occur; for the veneering sheet 13 we select a thin alloy sheet at least sufficiently thin so that, with the force applied by the roll electrodes 10 contact of the thin sheet 13 with the interposed carbon migration barrier C and the base metal 11 at the desired location of a weld is assured without damage to either roll electrode or veneering sheet. The thickness of the interposed carbon barrier sheet C may be regulated to condition the weld, it having been found that certain metals may be selected which will facilitate the union between the barrier sheet C and the base metal 11 and between the barrier sheet C and the alloy sheet 13.

In carrying the invention into practice veneering sheets of one-thirty second inch thickness and of non-corrosive character such as, straight chromium steels, austenitic-nickel-chromium steels, chromium-molybdenum steels, and the like have been welded to base metal plates three-fourths of an inch thick with successive welds in intersecting linear progression with such frequency as to constitute an integral bond between the veneering sheet 13, the carbon migration barrier C, and the base metal plate, such bonds between the three elements being made simultaneously and constituting better than 95% of the total surface operated upon. Copper, nickel, and molybdenum bearing steel barrier sheets C have been found to give satisfaction and there are undoubtedly others dependent upon the conditions imposed by the base plate and the type of stainless steel or other veneer surface. The welding is accomplished by successively precision indexing the welding rolls 10 for rows of adjacent and intersecting welds over the entire surfaces to be united and with a timing adjusted to constant rate of travel of the planer bed such that welds in the same row are so closely adjacent as to intersect and with subsequent rows so indexed as to also intersect. It is found that the best welding is secured with intermittent current pulses such that there is preheating and soaking previous to the actual welding; current pulses being variable for a wide range with excellent results.

Since the planer bed 1 moves at a constant rate of speed each time current is caused to flow in a series of pulses for a single weld by the timing equipment the electrode rolls 10 thus have moved to a new location, and the progression is so timed as to produce a succession of slightly overlapping welds for each electrode roll 10 as the plate makes a single pass under the welding electrodes; the process is, as stated, continued until there is substantially no unwelded area throughout the extent of the plate being operated upon.

In welding the veneering sheet 13 and its complementary migration barrier C to the base metal 11, which it might be here stated may also be thin, it is found that excellent results are secured if the electrode rolls 10 are indexed so that one roll 10 is at each edge of the plate so that the first bonding is at the edges, the rolls 10 may then be adjusted so as to weld an intermediate path, an unwelded area always preferably being between the roll electrodes 10, in this manner warping and distortion is kept at a minimum. It is desirable to emphasize here that in this set up to attain good results it is important that the procedure be on a precision basis in the same manner as in operating the planer as a precision machine tool, and this cannot be too strongly emphasized for all welding rows must be in parallel relation, of substantially uniform width and overlap, otherwise losses through shunt currents may become abnormally high.

As shown in Fig. 5, the welding current passes from one roll welding electrode 10 through the alloy sheet 13 to the metal base plate 11, out of the base plate 11 through the alloy sheet 13 and to the other roll welding electrode 10, thus avoiding any heating loss such as accurs if one electrode is contacted with the base metal plate 11.

While, in the foregoing, we have described our invention with respect to certain apparatus and certain thicknesses of plate and veneering sheet, it is to be understood that these are simply indications of what is being accomplished and that change in dimension of electrodes, pressures of electrodes, rates of welding, and welding current characteristics render it entirely feasible to produce, within the scope of the invention, veneered plate of thinner or thicker base metal and thicker or thinner veneer dimensions than those herein noted.

Figure 3:
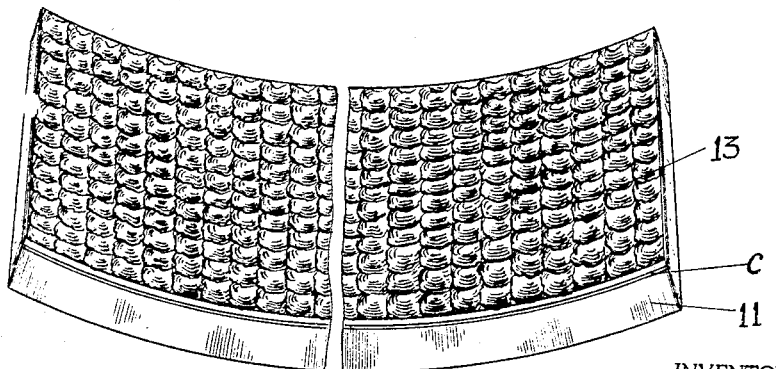
Fig. 3 is a perspective view of the completed article of Fig. 2 deformed by pressure to a required shape and which may form one element of a pressure vessel.
Figure 4:
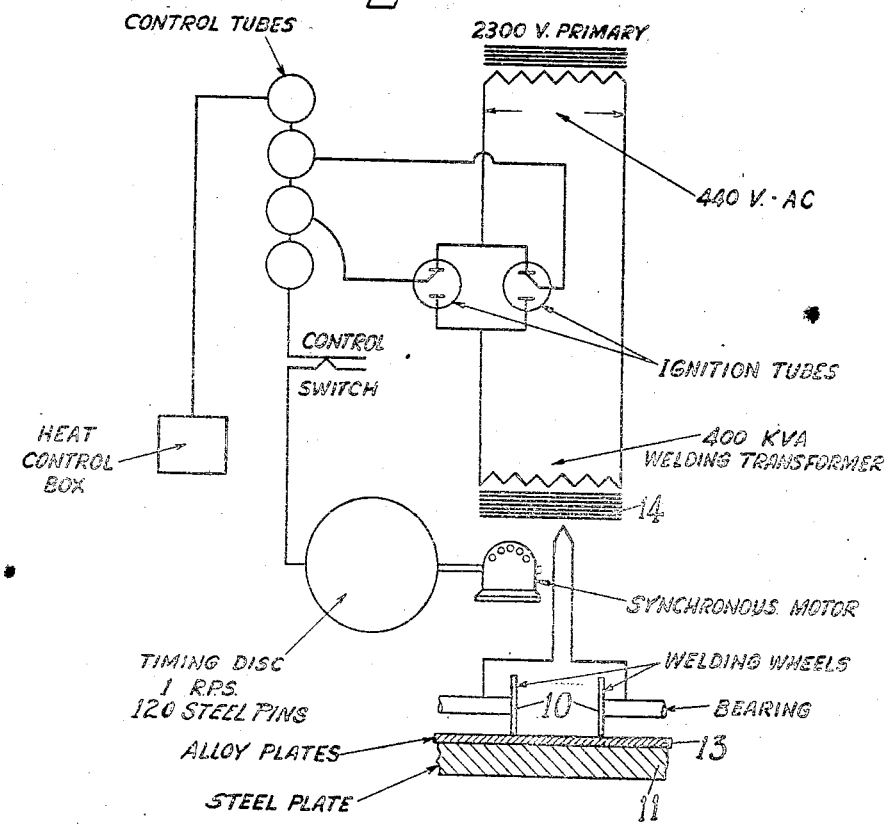
Fig. 4 is a diagrammatic view of the welding circuit and control.

In fabricating this plate into pressure structures it may be worked, reduced, pressed, rolled, forged or drawn as are usual plate elements. A veneered plate element rolled to curved form for embodiment in a cylindrical pressure vessel is indicated in Fig. 3.

Throughout the drawings dimensions are to be disregarded so far as thickness of veneering and the like are concerned, these drawings having been made simply for the purpose of indicating the principles involved.

It is, of course, to be understood that all of the plate manufactured in accordance with this invention, when required, is to be heat treated for normalizing.

We claim:

1. The method of manufacturing composite steel plate having a corrosion resistant surface layer, the method including the disposition of a plurality of thin (of the order of 3/64" or less) liner sheets of high chromium content steel over a thick base plate of steel with a thin (of the order of 3/64" or less) nickel sheet between the base plate and the liner sheets, subjecting the composite structure to a continuously high pressure at spots contactingly succeeding each other in a straight narrow zone, said pressure forcing the different metallic layers into close contact, simultaneously subjecting the pressure receiving spots to high density welding current applied in welding cycles each of which initially involves a plurality of short current impulses and a final longer current impulse which raises the temperature gradient of the composite structure to an extent sufficient to form a complete weld without excessive burning of the liner about the contact point, and repeating said operations in successively contacting zones until said metallic laminae are integrally united over substantially all of their effective areas.

2. The method of manufacturing corrosion resistant pressure vessels which includes the disposition of a plurality of thin (of the order of 3/64" or less) liner sheets of high chromium content steel over a thick base plate of steel with a thin (of the order of 3/64" or less) nickel sheet between the base plate and the liner sheets, subjecting the composite structure to a continuously high pressure at spots contactingly succeeding each other in a straight narrow zone, said pressure forcing the different metallic layers into close contact, simultaneously subjecting the pressure receiving spots to high density welding current applied in welding cycles each of which initially involves a plurality of short current impulses and a final longer current impulse which raises the temperature gradient of the composite structure to an extent sufficient to form a complete weld without excessive burning of the liner about the contact point, each cycle also including the transferring of heat from the liner contact surface between the initial current impulses so that at the beginning of the final current impulse the temperature at said surface is less than at the junctions of the different metallic strata, repeating said operations in successively contacting zones until said metallic laminae are integrally united over substantially all of their effective areas, bending a plurality of the welded composite structures to vessel determining contour, and welding the bent structures together to form a pressure vessel with a complete lining which is corrosion resistant.

3. The method of manufacturing pressure vessels having corrosion resistant liners, the method comprising the steps of disposing a plurality of thin liner sheets of corrosion resistant steel over a thick steel base plate with a thin sheet of nickel interposed to form a composite plate structure, the base plate including a moderate amount of carbon and the liner sheets being of such composition that they include an element which has a marked affinity for carbon, integrally uniting the base plate and said sheets throughout substantially all of their contacting surfaces by a resistance welding process which involves the production of overlapping rows of welds with the successive welds in each row overlapping, said process also involving welding cycles each of which includes a plurality of short current impulses and alternating periods of cooling of the liner surface sufficient to create such a temperature gradient in the composite plate structure that the exterior surface of the outside liner is considerably below the temperatures of the junctions of the various metallic laminae being welded, each cycle thereafter involving a final longer current impulse which raises the temperature gradient through the composite structure to a point where a complete weld is made without excessive burning at the liner contact point through which the current is supplied, the nickel sheet preventing the migration of carbon from the base plate and the consequent formation of excessive carbides in the liner, bending the welded composite plate structures to vessel determining contour, and welding the bent structures together to form the pressure vessel.

4. The method of manufacturing pressure vessels lined with relatively thin sheet metal having corrosion-resistant properties and a marked affinity for carbon, the method comprising the steps of superposing a thin nickel plate upon a thick base plate of carbon-bearing steel with a thin chromium-bearing sheet or plate on the other side of the nickel plate, the chromium-bearing sheet possessing the desired non-corrosive property and a marked affinity for carbon, integrating all of said elements by contacting electric resistance welds while preventing the migration of carbon from the base plate and the consequent production of chromium carbide, bending the integrated plates to the desired shapes, and welding them together to form a pressure vessel.

5. The method of manufacturing pressure vessels having a corrosion resistant liner formed of thin sheet steel of high chromium content, the method consisting of the steps of interposing a thin nickel sheet relative to a relatively thick steel base plate and a thin steel sheet of high chromium content, integrating said plate and said sheets by contacting resistance welds while preventing the formation of chromium carbide and the migration of carbon from the base plate, bending the integrated structure to a desired contour, and welding together similarly integrated and bent structures to form a pressure vessel.

6. A resistance welded product including composite metallic plate made up of a sheet of corrosion resistant metal having an affinity for carbon, a carbon bearing steel base plate; and an interposed metal sheet acting as a carbon migration barrier all united by overlapping resistance welds into an integral body; said barrier containing, in beneficial amount, a metal selected from the group containing copper, nickel, and molybdenum.

JAMES E. TRAINER.
JAMES C. HODGE.

CERTIFICATE OF CORRECTION.

Patent No. 2,214,002.  September 10, 1940.

JAMES E. TRAINER, ET AL.

It is hereby certified that error appears in the printed specification of the above numbered patent requiring correction as follows: Page 2, second column, line 41, for the word "providing" read --preventing--; and that the said Letters Patent should be read with this correction therein that the same may conform to the record of the case in the Patent Office.

Signed and sealed this 12th day of November, A. D. 1940.

Henry Van Arsdale,
Acting Commissioner of Patents.

(Seal)